(12) United States Patent
Sanae et al.

(10) Patent No.: US 10,946,702 B2
(45) Date of Patent: Mar. 16, 2021

(54) PNEUMATIC TIRE, MOLD FOR TIRE, AND METHOD FOR MANUFACTURING TIRE

(71) Applicant: SUMITOMO RUBBER INDUSTRIES, LTD., Hyogo (JP)

(72) Inventors: Ryuhei Sanae, Hyogo (JP); Yoshiaki Kanematsu, Hyogo (JP); Shintaro Tomita, Hyogo (JP); Daisuke Kudo, Hyogo (JP)

(73) Assignee: SUMITOMO RUBBER INDUSTRIES, LTD., Hyogo (JP)

(*) Notice: Subject to any disclaimer, the term of this patent is extended or adjusted under 35 U.S.C. 154(b) by 230 days.

(21) Appl. No.: 16/233,775

(22) Filed: Dec. 27, 2018

(65) Prior Publication Data
US 2019/0202245 A1     Jul. 4, 2019

(30) Foreign Application Priority Data

Dec. 28, 2017 (JP) .............................. JP2017-253892

(51) Int. Cl.
*B60C 13/02* (2006.01)
*B60C 15/024* (2006.01)
*B29D 30/06* (2006.01)

(52) U.S. Cl.
CPC .......... *B60C 13/02* (2013.01); *B29D 30/0606* (2013.01); *B60C 15/0242* (2013.01); *B29D 2030/0612* (2013.01)

(58) Field of Classification Search
CPC ..... B60C 13/00; B60C 13/001; B60C 13/002; B60C 13/02; B60C 13/023
See application file for complete search history.

(56) References Cited

U.S. PATENT DOCUMENTS 4,120,337 A * 10/1978 Soma ..................... B60C 3/04
152/454
2014/0027034 A1* 1/2014 Molzow-Voit ...... B60C 15/0242
152/513

FOREIGN PATENT DOCUMENTS

EP       2913206      *  9/2015
JP     11-268507         10/1999

* cited by examiner

*Primary Examiner* — Justin R Fischer
(74) *Attorney, Agent, or Firm* — Greenblum & Bernstein, P.L.C.

(57) ABSTRACT

A rim guard of a tire has a top, an inner surface, and an outer surface. A contour of the inner surface is represented by a circular arc, and the circular arc has a radius of not less than 20 mm and not greater than 30 mm. A contour of the outer surface is represented by a circular arc, and the circular arc has a radius of not less than 100 mm and not greater than 500 mm. In a radial direction, a position of an outer edge of the outer surface coincides with a cross-sectional width specified position, or the outer edge of the outer surface is located outward of the cross-sectional width specified position.

16 Claims, 3 Drawing Sheets

PNEUMATIC TIRE, MOLD FOR TIRE, AND METHOD FOR MANUFACTURING TIRE

The present application is based upon and claims the benefit of priority to Japanese Patent Application No. 2017-253892, filed Dec. 28, 2017, the entire contents of which are incorporated herein by reference.

BACKGROUND OF THE INVENTION

Field of the Invention

The present invention relates to pneumatic tires, molds for the tires, and methods for manufacturing the tires. Specifically, the present invention relates to pneumatic tires having rim guards at side surfaces thereof, molds for manufacturing the tires, and methods for manufacturing the tires.

Description of the Related Art

A curb is normally arranged at the boundary between a roadway and a sidewalk. When a vehicle is moved close to a road shoulder, the sidewall of a tire may come into contact with the curb. Tires are fitted to rims. Thus, when a vehicle is moved close to a road shoulder, the rim may come into contact with the curb.

There is a tire provided with rim guards at side surfaces thereof. Each rim guard projects outward from the external surface of a sidewall. With the tire, the rim guard comes into contact with a curb earlier than the sidewall or the rim. With the tire, the sidewall or the rim is less likely to be damaged. However, the tire is heavier than a tire that does not have any rim guard. The rim guards influence the stiffness of the tire. Due to such circumstances, various studies have been made for rim guards of tires (for example, Japanese Laid-Open Patent Publication No. H11-268507).

The present invention has been made in view of the above circumstances, and an object of the present invention is to provide a pneumatic tire that has improved appearance quality and an improved protection function by each rim guard.

SUMMARY OF THE INVENTION

A pneumatic tire according to the present invention includes a tread; and a pair of side portions each located radially inward of an edge of the tread, and each side portion includes a main body and a rim guard projecting axially outward from an external surface of the main body.

The rim guard has a top, an inner surface located radially inward of the top, and an outer surface located radially outward of the top.

A contour of the inner surface is represented by a circular arc having a center at an outer side of the tire, and the circular arc has a radius of not less than 20 mm and not greater than 30 mm.

A contour of the outer surface is represented by a circular arc having a center at the outer side of the tire, and the circular arc has a radius of not less than 100 mm and not greater than 500 mm.

In a radial direction, a position of an outer edge of the outer surface coincides with a cross-sectional width specified position, or the outer edge of the outer surface is located outward of the cross-sectional width specified position.

Preferably, in the pneumatic tire, a height in the radial direction from a bead base line to the top is not less than 28 mm and not greater than 35 mm.

Preferably, in the pneumatic tire, a length from the external surface of the main body to the top is not less than 5 mm and not greater than 7 mm.

Preferably, in the pneumatic tire, a ratio of a distance in the radial direction from a bead base line to the outer edge of the outer surface of the rim guard relative to a distance in the radial direction from the bead base line to the cross-sectional width specified position is not less than 1.01 and not greater than 1.3.

Preferably, in the pneumatic tire, a contour of the external surface of the main body is represented by a plurality of circular arcs. The circular arcs include: a lower circular arc that represents a portion at a radially inner side of the cross-sectional width specified position; and an upper circular arc that represents a portion at a radially outer side of the cross-sectional width specified position, and the upper circular arc is tangent to the lower circular arc at the cross-sectional width specified position.

Preferably, in the pneumatic tire, the side portion includes a sidewall located radially inward of the edge of the tread and a clinch located radially inward of the sidewall, and a boundary between the sidewall and the clinch is included in the rim guard. More preferably, an edge of the boundary is located on the inner surface.

Preferably, the pneumatic tire has an aspect ratio of not less than 25% and not greater than 55%.

According to another aspect, a mold for a tire according to the present invention is a mold for manufacturing a tire including a tread and a pair of side portions each located radially inward of an edge of the tread, each side portion including a main body and a rim guard projecting axially outward from an external surface of the main body, the rim guard having a top, an inner surface located radially inward of the top, and an outer surface located radially outward of the top.

The mold has a cavity face in which a shape of an external surface of the tire is reflected.

A portion corresponding to the rim guard, of the cavity face, includes a top-corresponding surface in which a shape of the top is reflected, an inner surface-corresponding surface in which a shape of the inner surface is reflected, and an outer surface-corresponding surface in which a shape of the outer surface is reflected.

A contour of the inner surface-corresponding surface is represented by a circular arc having a center in a portion corresponding to an outer side of the tire, and the circular arc has a radius of not less than 20 mm and not greater than 30 mm.

A contour of the outer surface-corresponding surface is represented by a circular arc having a center in the portion corresponding to the outer side of the tire, and the circular arc has a radius of not less than 100 mm and not greater than 500 mm.

In a radial direction, a position of an outer edge of the outer surface-corresponding surface coincides with a position corresponding to a cross-sectional width specified position of the tire, or the outer edge of the outer surface-corresponding surface is located outward of the position corresponding to the cross-sectional width specified position.

According to still another aspect, a method for manufacturing a tire according to the present invention is a method for manufacturing a tire including a tread and a pair of side portions each located radially inward of an edge of the tread, each side portion including a main body and a rim guard projecting axially outward from an external surface of the main body, each rim guard having a top, an inner surface located radially inward of the top, and an outer surface located radially outward of the top.

The method includes the steps of:
(1) preparing a raw cover for the tire;
(2) putting the raw cover into a mold; and
(3) pressing and heating the raw cover within the mold.

The mold has a cavity face in which a shape of an external surface of the tire is reflected.

A portion corresponding to the rim guard, of the cavity face, includes a top-corresponding surface in which a shape of the top is reflected, an inner surface-corresponding surface in which a shape of the inner surface is reflected, and an outer surface-corresponding surface in which a shape of the outer surface is reflected.

A contour of the inner surface-corresponding surface is represented by a circular arc having a center in a portion corresponding to an outer side of the tire, and the circular arc has a radius of not less than 20 mm and not greater than 30 mm.

A contour of the outer surface-corresponding surface is represented by a circular arc having a center in the portion corresponding to the outer side of the tire, and the circular arc has a radius of not less than 100 mm and not greater than 500 mm.

In a radial direction, a position of an outer edge of the outer surface-corresponding surface coincides with a position corresponding to a cross-sectional width specified position of the tire, or the outer edge of the outer surface-corresponding surface is located outward of the position corresponding to the cross-sectional width specified position.

DETAILED DESCRIPTION OF THE EMBODIMENTS

The following will describe in detail the present invention based on preferred embodiments with appropriate reference to the drawings.

Figure 1:
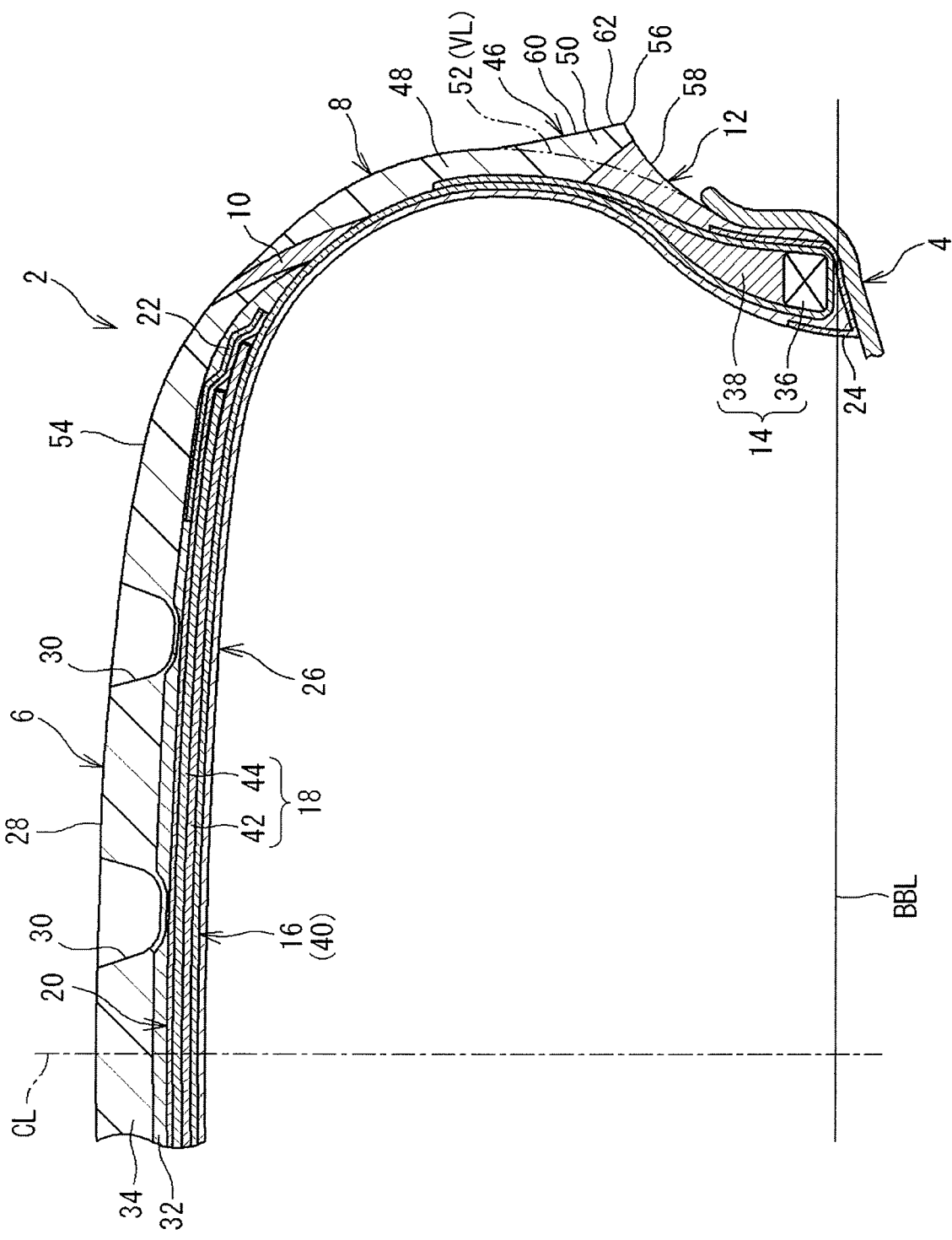
FIG. 1 is a cross-sectional view of a part of a pneumatic tire according to an embodiment of the present invention.

FIG. 1 shows a pneumatic tire 2. Specifically, FIG. 1 shows a cross-section of the tire 2 taken along a plane including the rotation axis (not shown) of the tire 2. In FIG. 1, the up-down direction is the radial direction of the tire 2, the right-left direction is the axial direction of the tire 2, and the direction perpendicular to the surface of the sheet is the circumferential direction of the tire 2. In FIG. 1, an alternate long and short dash line CL represents the equator plane of the tire 2. The tire 2 has a shape symmetrical about the equator plane CL except for a tread pattern. In FIG. 1, a solid line BBL extending in the axial direction is a bead base line. The bead base line BBL is a line that defines the rim diameter (see JATMA) of a normal rim.

The tire 2 is fitted to a rim 4. The rim 4 is a normal rim. The interior of the tire 2 is filled with air. Accordingly, the internal pressure of the tire 2 is adjusted.

In the present invention, unless otherwise specified, the dimensions and angles of each component of the tire 2 are measured in a state where the tire 2 is mounted on a normal rim and inflated with air to a normal internal pressure (also referred to as normal state). During the measurement, no load is applied to the tire 2.

In the present specification, the normal rim means a rim specified in a standard on which the tire 2 is based. The "standard rim" in the JATMA standard, the "Design Rim" in the TRA standard, and the "Measuring Rim" in the ETRTO standard are normal rims.

In the present specification, the normal internal pressure means an internal pressure specified in the standard on which the tire 2 is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures.

In the present specification, a normal load means a load specified in the standard on which the tire 2 is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRO standard are normal loads.

[Structure of Tire 2]

The tire 2 is used for a passenger car. The tire 2 includes a tread 6, a pair of sidewalls 8, a pair of wings 10, a pair of clinches 12, a pair of beads 14, a carcass 16, a belt 18, a band 20, a pair of edge bands 22, a pair of chafers 24, and an inner liner 26.

The tread 6 is formed from a crosslinked rubber. The tire 2 stands on a road surface at an outer circumferential surface 28 of the tread 6. The outer circumferential surface 28 of the tread 6 is a tread surface. In the tire 2, grooves 30 are formed on the tread 6.

The tread 6 of the tire 2 has a base layer 32 and a cap layer 34. The base layer 32 is normally formed from a crosslinked rubber having excellent adhesion. The cap layer 34 is located radially outward of the base layer 32. The cap layer 34 is normally formed from a crosslinked rubber having excellent abrasion resistance.

Each sidewall 8 is located radially inward of the edge of the tread 6. The sidewall 8 is located axially outward of the carcass 16. The sidewall 8 is normally formed from a crosslinked rubber having excellent cut resistance.

Each wing 10 is located between the tread 6 and the sidewall 8. The wing 10 is normally formed from a crosslinked rubber having excellent adhesion. The wing 10 joins the tread 6 and the sidewall 8 to each other.

Each clinch 12 is located radially inward of the sidewall 8. The clinch 12 is normally formed from a crosslinked rubber having excellent abrasion resistance. The clinch 12 comes into contact with the rim 4.

Each bead 14 is located axially inward of the clinch 12. The bead 14 includes a core 36 and an apex 38. The core 36 includes a metallic wire, and the apex 38 is formed from a hard crosslinked rubber.

The carcass 16 extends on and between one of the beads 14 and the other of the beads 14 at the inner side of the tread 6, the sidewalls 8, and the clinches 12. The carcass 16 includes a carcass ply 40. The carcass ply 40 is turned up around each core 36 from the inner side toward the outer side in the axial direction. The carcass 16 may be composed of two or more carcass plies 40.

The carcass ply 40 includes a large number of cords aligned with each other, which are not shown. The carcass 16 has a radial structure. The angle of each cord relative to the equator plane CL is not less than 70° and not greater than 90°. The cords are formed from an organic fiber. Examples of the organic fiber include polyester fibers, nylon fibers, rayon fibers, and aramid fibers.

The belt 18 is layered over the carcass 16 at the radially inner side of the tread 6. The belt 18 of the tire 2 includes an inner layer 42 and an outer layer 44. Each of the inner layer 42 and the outer layer 44 includes a large number of cords aligned with each other, which are not shown. These cords are tilted relative to the equator plane CL. The angle of each cord relative to the equator plane CL is normally set within a range of not less than 10° and not greater than 35°. The material of the cords is normally steel. As the cords of the belt 18, cords formed from an organic fiber as with the carcass ply 40 may be used.

The band 20 covers the belt 18. The band 20 includes a helically wound cord, which is not shown. The cord of the band 20 extends substantially in the circumferential direction. The band 20 has a jointless structure. In the band 20, a cord formed from an organic fiber as with the carcass ply 40 is used.

Each edge band 22 covers edge portions of the band 20 and the belt 18. The edge band 22 includes a helically wound cord, which is not shown. The cord of the edge band 22 extends substantially in the circumferential direction. The edge band 22 has a jointless structure. In the edge band 22, a cord formed from an organic fiber as with the carcass ply 40 is used.

Each chafer 24 is located at a bead 14 portion of the tire 2. In a state where the tire 2 is mounted on the rim 4, the chafer 24 is in contact with the rim 4. The chafer 24 includes a fabric and a rubber with which the fabric is impregnated.

The inner liner 26 is located inward of the carcass 16. The inner liner 26 forms the inner circumferential surface of the tire 2. The inner liner 26 is formed from a crosslinked rubber that is less likely to pass air therethrough.

Figure 2:
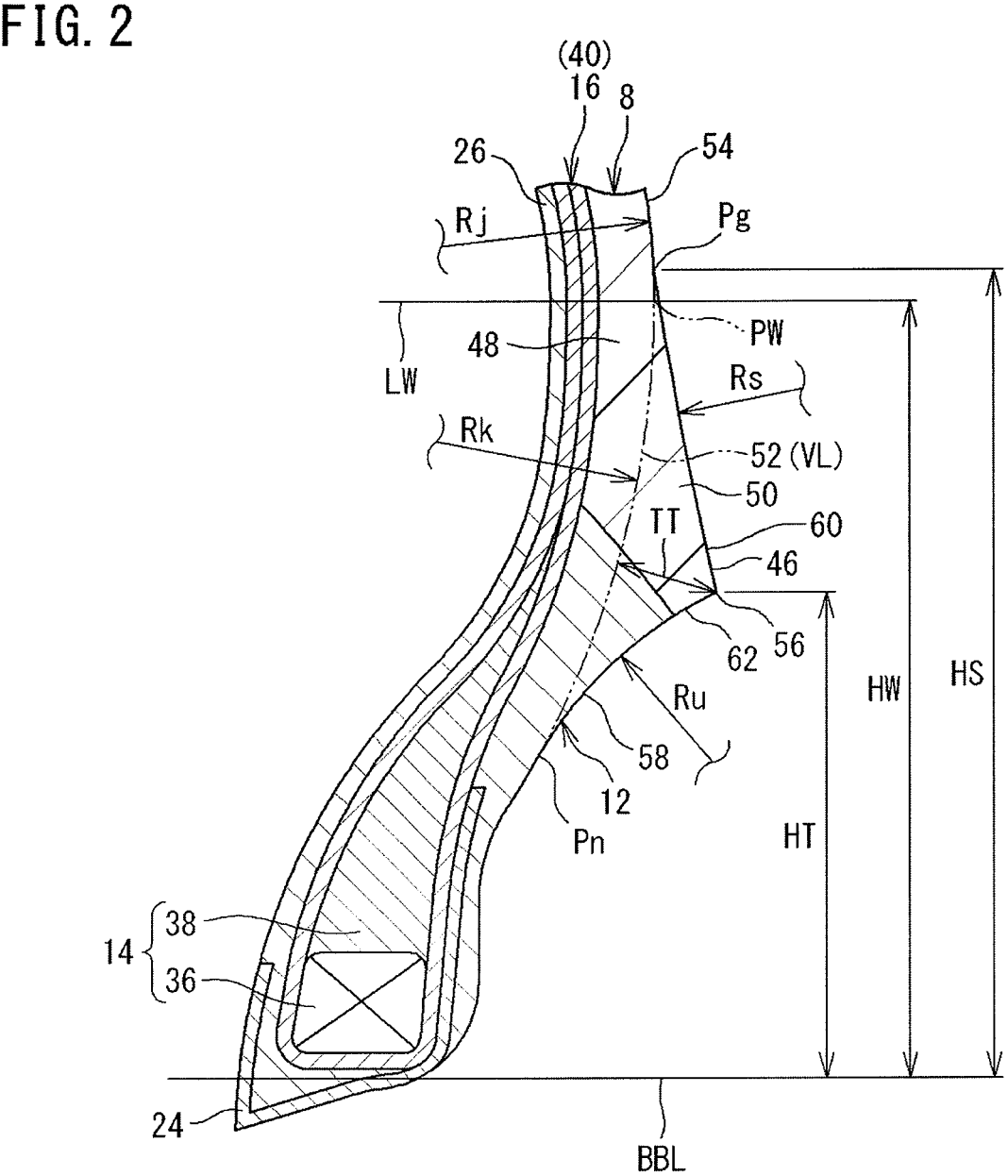
FIG. 2 is a cross-sectional view of a part of the tire in FIG. 1.

FIG. 2 shows a portion from the sidewall 8 to the clinch 12 of the tire 2. In FIG. 2, the up-down direction is the radial direction of the tire 2, the right-left direction is the axial direction of the tire 2, and the direction perpendicular to the surface of the sheet is the circumferential direction of the tire 2. FIG. 2 shows the cross-section of the tire 2 taken along the plane including the rotation axis (not shown) of the tire 2.

In the present invention, a portion that is located between the tread 6 (specifically, the wing 10) and the core 36 of the bead 14 and at the axially outer side of the carcass 16 is referred to as a side portion 46. The side portion 46 includes the sidewall 8 and the clinch 12. In the tire 2, the side portion 46 is composed of the sidewall 8 and the clinch 12. The side portion 46 extends radially inward along the carcass 16 from the wing 10.

The tire 2 includes the tread 6 and a pair of side portions 46 each located radially inward of the edge of the tread 6. Each side portion 46 includes a main body 48 and a rim guard 50. The rim guard 50 extends axially outward from an external surface 52 of the main body 48. The rim guard 50 extends in the circumferential direction. The rim guard 50 has a ring shape.

In FIG. 2, an alternate long and two short dashes line VL represents the boundary between the main body 48 and the rim guard 50. The boundary VL forms a part of the side portion 46 obtained on the assumption that the rim guard 50 is not provided, that is, a part of the external surface 52 of the main body 48. In FIG. 2, reference character PW represents a specific position on the external surface 52 of the main body 48. The position PW is an axially outer end of the tire 2 obtained on the assumption that the rim guard 50 is not provided. At the position PW, a cross-sectional width (see JATMA) of the tire 2 is specified. In the present invention, the position PW is referred to as a cross-sectional width specified position. In FIG. 2, a solid line LW is a straight line that passes through the cross-sectional width specified position PW and extends in the axial direction. In the present invention, the straight line LW is also referred to as cross-sectional width reference line.

In the tire 2, the contour of the external surface 52 of the main body 48 is represented by using a plurality of circular arcs. In FIG. 2, an arrow Rk represents the radius of a circular arc that represents the contour of a portion, at the radially inner side of the cross-sectional width specified position PW, of the external surface 52 of the main body 48 (hereinafter, also referred to as lower circular arc). The lower circular arc has a center on the cross-sectional width reference line LW and passes through the cross-sectional width specified position PW. In FIG. 2, an arrow Rj represents the radius of a circular arc that represents the contour of a portion, at the radially outer side of the cross-sectional width specified position PW, of the external surface 52 of the main body 48 (hereinafter, also referred to as upper circular arc). The upper circular arc has a center on the cross-sectional width reference line LW and passes through the cross-sectional width specified position PW. The upper circular arc is tangent to the aforementioned lower circular arc at the cross-sectional width specified position PW.

In the tire 2, the radius Rk of the lower circular arc and the radius Rj of the upper circular arc are determined according to the specifications of the tire 2. The radius Rk of the lower circular arc is normally set within a range of 20 mm to 70 mm as appropriate. The radius Rj of the upper circular arc is normally set within a range of 20 mm to 70 mm as appropriate.

In the present invention, the contours of the tire 2 and each portion of the tire 2 are specified on the basis of the tire 2 in a state where: the tire 2 is mounted on a normal rim; the internal pressure of the tire 2 is maintained at 5% of a normal internal pressure; and no load is applied to the tire 2. The contour of an external surface 54 of the tire 2 specified as described above corresponds to the shape of the cavity face of a later-described mold.

In the tire 2, the rim guard 50 has a top 56, an inner surface 58, and an outer surface 60. The top 56 is an axially outer end of the rim guard 50. The top 56 is specified at a position, on an external surface 62 of the rim guard 50, farthest from the external surface 52 of the main body 48. The rim guard 50 has a maximum thickness at the top 56. The inner surface 58 is located radially inward of the top 56. In the tire 2, the outer edge of the inner surface 58 coincides with the top 56. In FIG. 2, reference character Pn represents the inner edge of the inner surface 58. The inner surface 58 is in contact with the external surface 52 of the main body 48 at the inner edge Pn thereof. The outer surface 60 is located radially outward of the top 56. In the tire 2, the inner edge of the outer surface 60 coincides with the top 56. In FIG. 2, reference character Pg represents the outer edge of the outer surface 60. The outer surface 60 is in contact with the external surface 52 of the main body 48 at the outer edge Pg thereof.

In the cross-section of the tire 2 shown in FIG. 2, the contour of the inner surface 58 connecting the inner edge Pn of the inner surface 58 to the top 56 is represented by a circular arc. In FIG. 2, an arrow Ru represents the radius of the circular arc that represents the contour of the inner surface 58 (hereinafter, also referred to as inner circular arc). In the tire 2, the center of the inner circular arc is located at the outer side of the tire 2. The inner circular arc is tangent to the lower circular arc of the main body 48 at the inner edge Pn.

In the cross-section of the tire 2 shown in FIG. 2, the contour of the outer surface 60 connecting the outer edge Pg of the outer surface 60 to the top 56 is represented by a circular arc. In FIG. 2, an arrow Rs represents the radius of the circular arc that represents the contour of the outer surface 60 (hereinafter, also referred to as outer circular arc). In the tire 2, the center of the outer circular arc is located at the outer side of the tire 2. In the tire 2, the outer circular arc is tangent to the upper circular arc of the main body 48 at the outer edge Pg.

In the present invention, the top 56 of the rim guard 50 is represented by the point of intersection of the inner circular arc and the outer circular arc. Thus, in the case where a top 56 portion is rounded, the top 56 is specified by obtaining the point of intersection of an extension of the inner circular arc and an extension of the outer circular arc.

[Method and Mold for Manufacturing Tire 2]

The tire 2 described above is produced as follows. The method for manufacturing the tire 2 includes a preparation step, an input step, and a vulcanization step. The following will describe the preparation step, the input step, and the vulcanization step.

Although not shown, in the case of manufacturing the tire 2, uncrosslinked members for the tread 6, the sidewalls 8, etc., are combined on a drum of a former in the preparation step. Accordingly, a raw cover is prepared. The raw cover is an uncrosslinked tire 2. A step in which the raw cover is assembled is also referred to as a forming step.

Figure 3:
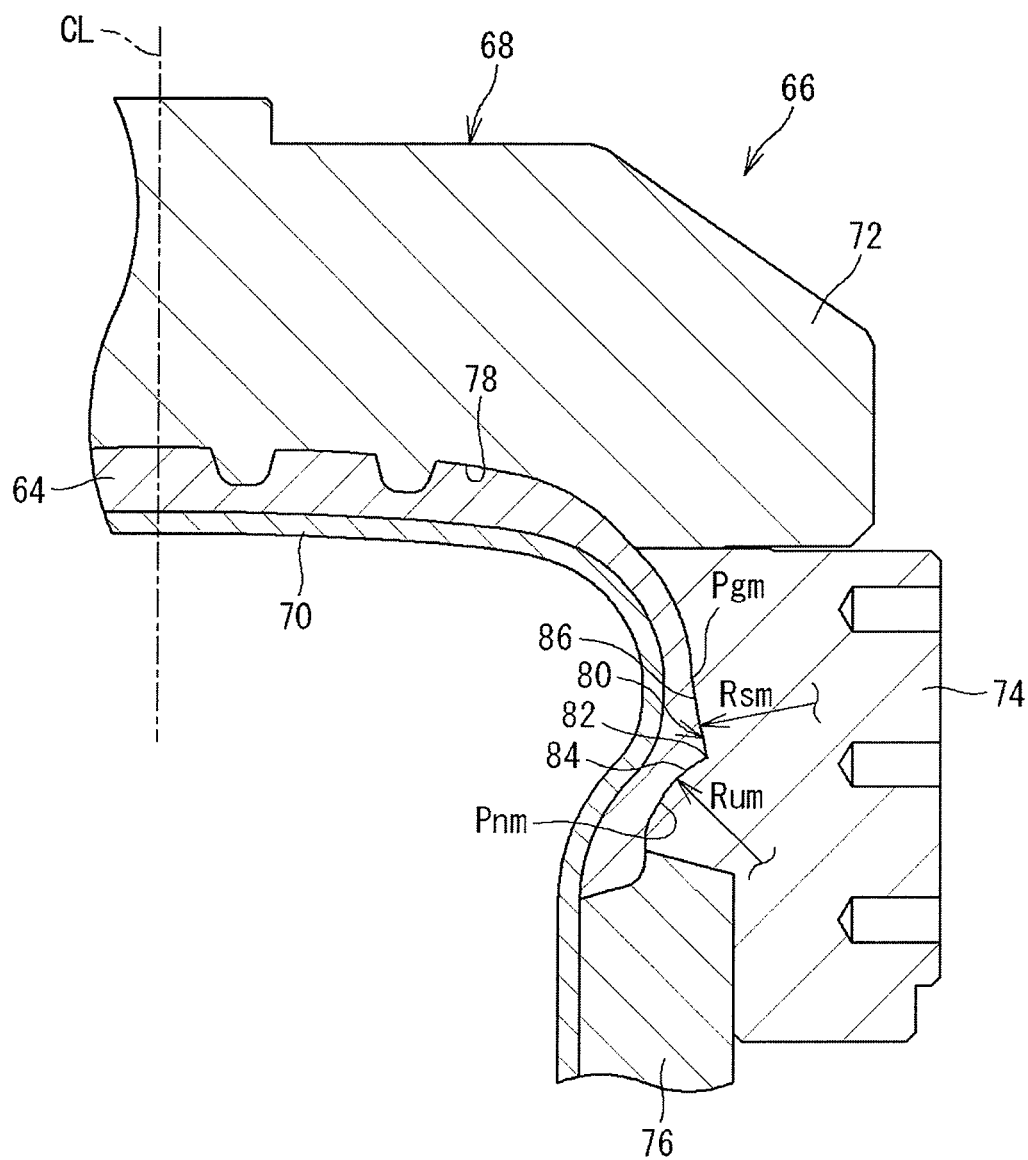
FIG. 3 is a schematic diagram of a part of a vulcanizer for manufacturing the tire in FIG. 1.

In this manufacturing method, the raw cover 64 obtained in the preparation step is molded into the tire 2 in a vulcanizer 66 shown in FIG. 3. The vulcanizer 66 includes a mold 68 and a bladder 70. The bladder 70 is located inside the mold 68. In FIG. 3, the mold 68 is closed by an opening/closing means, which is not shown. In the manufacturing method, the vulcanizer 66 is not particularly limited, and a vulcanizer that is generally used for manufacturing tires is used. In FIG. 3, the up-down direction is the radial direction of the tire 2, the right-left direction is the axial direction of the tire 2, and the direction perpendicular to the surface of the sheet is the circumferential direction of the tire 2.

The mold 68 for manufacturing the tire 2 includes a segment 72, a side plate 74, and a bead ring 76. The mold 68 is a two phase mold, which is generally used for manufacturing tires. In the mold 68, a cavity face 78 is formed by combining the segment 72, the side plate 74, and the bead ring 76. The cavity face 78 shapes the external surface 54 of the tire 2. The shape of the external surface 54 of the tire 2 is reflected in the cavity face 78. A space formed between the cavity face 78 and the bladder 70 is referred to as a cavity.

In the input step, the raw cover 64 formed in the preparation step is put into the mold 68. Thereafter, the bladder 70 located inside the raw cover 64 is filled with gas. The bladder 70 expands, and the shape of the raw cover 64 is made into a proper shape. As shown in FIG. 3, the mold 68 is closed, and the internal pressure of the bladder 70 is increased. Accordingly, the raw cover 64 is set within the cavity. In the manufacturing method, a core may be used instead of the bladder 70. The core has a toroidal external surface. The external surface is approximate to the shape of the internal surface of the tire 2 that has been inflated with air such that the internal pressure thereof is maintained at 5% of a normal internal pressure.

In the vulcanization step, the raw cover 64 is held and pressed between the mold 68 and the bladder 70. The raw cover 64 is heated by heat transfer from the mold 68 and the bladder 70. In the vulcanization step, the raw cover 64 is pressed and heated within the mold 68. Due to the pressing and the heating, a rubber composition of the raw cover 64 flows. Crosslinking reaction is caused in the rubber composition to obtain the tire 2 shown in FIG. 1. In the manufacturing method, the conditions for molding the tire 2 in the vulcanizer 66 are not particularly limited. The tire molding conditions that are generally adopted are applied to the manufacturing method.

The mold 68 has the cavity face 78 in which the shape of the external surface 54 of the tire 2 is reflected. In the mold 68, a portion corresponding to the rim guard 50 (hereinafter, also referred to as rim guard-corresponding portion 80), of the cavity face 78, is provided on the side plate 74. The rim guard-corresponding portion 80 includes: a top-corresponding surface 82 in which the shape of the top 56 of the rim guard 50 is reflected; an inner surface-corresponding surface 84 in which the shape of the inner surface 58 of the rim guard 50 is reflected; and an outer surface-corresponding surface 86 in which the shape of the outer surface 60 of the rim guard 50 is reflected. The inner surface-corresponding surface 84 is located radially inward of the top-corresponding surface 82. The outer surface-corresponding surface 86 is located radially outward of the top-corresponding surface 82.

In FIG. 3, reference character Pnm represents the inner edge of the inner surface-corresponding surface 84. The inner edge Pnm corresponds to the inner edge Pn of the rim guard 50. Reference character Pgm represents the outer edge of the outer surface-corresponding surface 86. The outer edge Pgm corresponds to the outer edge Pg of the rim guard 50.

As described above, in the tire 2, the contour of the inner surface 58 of the rim guard 50 is represented by a circular arc having a center at the outer side of the tire 2. Therefore, in the mold 68, the contour of the inner surface-corresponding surface 84 is represented by a circular arc having a center in a portion corresponding to the outer side of the tire 2.

In FIG. 3, an arrow Rum represents the radius of the circular arc that represents the contour of the inner surface-corresponding surface 84. As described above, the contour of the external surface 54 of the tire 2 corresponds to the shape of the cavity face 78 of the mold 68. Therefore, the radius Rum of the circular arc is equal to the radius Ru of the aforementioned inner circular arc.

As described above, in the tire 2, the contour of the outer surface 60 of the rim guard 50 is represented by a circular arc having a center at the outer side of the tire 2. Therefore, in the mold 68, the contour of the outer surface-corresponding surface 86 is represented by a circular arc having a center in the portion corresponding to the outer side of the tire 2.

In FIG. 3, an arrow Rsm represents the radius of the circular arc that represents the contour of the outer surface-corresponding surface 86. As described above, the contour of the external surface 54 of the tire 2 corresponds to the shape of the cavity face 78 of the mold 68. Therefore, the radius Rsm of the circular arc is equal to the radius Rs of the aforementioned outer circular arc.

As described above, the contour of the external surface 54 of the tire 2 corresponds to the shape of the cavity face 78 of the mold 68. Therefore, in the present specification, the effect based on the shape of the cavity face 78 of the mold 68 is explained by the effect based on the contour of the external surface 54 of the tire 2.

In the tire 2, the rim guards 50 have a pointed shape. Regarding a tire having such rim guards having a pointed shape, depending on the sizes of outer circular arc and inner circular arc, there are the following concerns: (1) when a raw cover is put into a mold to mold the tire, there is a possibility that rubber locally flows near the rim guard and thus the shape of a clinch or an apex deviates from the desired shape; (2) when the raw cover is put into the mold, there is a possibility that, near a position corresponding to the outer edge of the rim guard, the raw cover and the mold initially come into contact with each other, the air present between the raw cover and the mold is divided into air at the outer side and air at the inner side with respect to the position of the contact, and thus the air cannot be sufficiently discharged from the mold; (3) in this case, for discharging air, vent holes or vent pieces need to be provided in the mold and at the outer side and the inner side with respect to the position of the contact; and (4) the stiffness of the rim guard having a pointed shape is lower than the stiffness of a rim guard having a trapezoidal shape, and thus there is a possibility that, depending on the degree of shock caused when the rim guard comes into contact with a curb, the rim guard greatly deforms and cannot perform a function as a rim guard (hereinafter, also referred to as protection function).

In the tire 2, the contour of the inner surface 58 of the rim guard 50 is represented by a circular arc that is inwardly curved, and the radius Ru of this circular arc, that is, the inner circular arc, is not less than 20 mm and not greater than 30 mm. The contour of the outer surface 60 of the rim guard 50 is represented by a circular arc that is inwardly curved, and the radius Rs of this circular arc, that is, the outer circular arc, is not less than 100 mm and not greater than 500 mm. In the tire 2, the circular arcs that represent the respective contours of the inner surface 58 and the outer surface 60 of the rim guard 50 are larger than the circular arcs that represent the respective contours of the inner surface and the outer surface of a conventional rim guard. Thus, in molding the tire 2 within the mold 68, local flow of rubber near the rim guard 50, which is observed for a conventional tire, is effectively inhibited. The rim guard 50 effectively inhibits the shapes of the components such as the apexes 38 and the clinches 12 of the tire 2 from deviating from the desired shapes.

In the tire 2, furthermore, in the radial direction, the position of the outer edge Pg of the outer surface 60 coincides with the cross-sectional width specified position PW, or the outer edge Pg of the outer surface 60 is located outward of the cross-sectional width specified position PW. Regarding the tire 2, in molding the tire 2 within the mold 68, the air present between the raw cover 64 and the mold 68 is not divided at a position corresponding to the outer edge Pg of the rim guard 50, and is effectively discharged from the position corresponding to the outer edge Pg toward the top 56 of the rim guard 50. Since the circular arc that represents the contour of the outer surface 60 is relatively large, flow of air from the position corresponding to the outer edge Pg toward the top 56 is easily generated at the tire 2. At the tire 2, air is effectively inhibited from remaining on the side portion 46. This contributes to reduction of the number of vent pieces or vent holes provided in the mold 68 in order to discharge air.

In the mold 68 for manufacturing the tire 2, vent holes or vent pieces having a diameter of not less than 0.4 mm and not greater than 1.5 mm, which are not shown, can be provided in the top-corresponding surface 82. In this case, flow of air from the position corresponding to the outer edge Pg toward the top 56 is effectively promoted. From the viewpoint of effectively inhibiting the retention of air which influences appearance quality, vent holes or vent pieces having a diameter of not less than 0.4 mm and not greater than 1.5 mm are preferably provided in the top-corresponding surface 82 of the mold 68.

Although not shown, in the mold 68, positions at which the mold 68 is divided may be adjusted such that the position at which the side plate 74 and the bead ring 76 come into contact with each other corresponds to the top-corresponding surface 82. The gap between the side plate 74 and the bead ring 76 serves as a flow path for air. Thus, in this case as well, flow of air from the position corresponding to the outer edge Pg toward the top 56 is effectively promoted.

As described above, in the tire 2, the circular arcs that represent the respective contours of the inner surface 58 and the outer surface 60 of the rim guard 50 are larger than the circular arcs that represent the respective contours of the inner surface and the outer surface of a conventional rim guard. That is, the rim guard 50 of the tire 2 is larger than a rim guard of a conventional tire. The rim guard 50 is less likely to deform even when coming into contact with a curb. In the tire 2, the protection function of the rim guard 50 is also improved. Furthermore, the outer surface 60 of the rim guard 50 is gently curved as compared to that of a conventional rim guard. Thus, during running of the tire 2, smooth air flow is generated near the rim guard 50. The air resistance is low, and thus the tire 2 contributes to improvement of fuel economy of a vehicle. Since the stiffness of the tire 2 is gently increased from the edge of the tread 6 toward the top 56 of the rim guard 50, the sensitivity of the tire 2 to load change is low. Therefore, with the tire 2, steering stability and ride comfort are well balanced. As described above, with the tire 2, not only the appearance quality and the protection function of the rim guard 50 are improved, but also reduction of air resistance and improvement of steering stability and ride comfort are achieved.

As described above, in the tire 2, the radius Ru of the inner circular arc is not less than 20 mm and not greater than 30 mm. Accordingly, not only the appearance quality and the protection function of the rim guard 50 are improved, but also steering stability and ride comfort are improved. From this viewpoint, in the tire 2, the radius Ru of the inner circular arc is preferably not less than 22 mm and preferably not greater than 28 mm. Since the radius Rum of the circular arc that represents the contour of the inner surface-corresponding surface 84 of the mold 68 is equal to the radius Ru of the inner circular arc, the radius Rum is not less than 20 mm and not greater than 30 mm, preferably not less than 22 mm, and preferably not greater than 28 mm.

As described above, in the tire 2, the radius Rs of the outer circular arc is not less than 100 mm and not greater than 500 mm. Accordingly, not only the appearance quality and the protection function of the rim guard 50 are improved, but also reduction of air resistance and improvement of steering stability and ride comfort are achieved. From this viewpoint, the radius Rs of the outer circular arc is preferably not less than 200 mm and more preferably not less than 250 mm. The radius Rs of the outer circular arc is preferably not greater than 400 mm and more preferably not greater than 350 mm. Since the radius Rsm of the circular arc that represents the contour of the outer surface-corresponding surface 86 of the mold 68 is equal to the radius Rs of the outer circular arc, the radius Rsm is not less than 100 mm and not greater than 500 mm, preferably not less than 200 mm, and preferably not greater than 400 mm. The radius Rsm is more preferably not less than 250 mm and more preferably not greater than 350 mm.

In FIG. 2, a double-headed arrow HW represents the distance in the radial direction from the bead base line BBL to the cross-sectional width specified position PW. A double-headed arrow HS represents the distance in the radial direction from the bead base line BBL to the outer edge Pg of the rim guard 50. The distance HW and the distance HS are specified for the tire 2 in a state where: the tire 2 is mounted on a normal rim; the internal pressure of the tire 2 is maintained at 5% of a normal internal pressure; and no load is applied to the tire 2.

As described above, in the tire 2, in the radial direction, the position of the outer edge Pg of the outer surface 60 coincides with the cross-sectional width specified position PW, or the outer edge Pg of the outer surface 60 is located outward of the cross-sectional width specified position PW. That is, the ratio of the distance HS in the radial direction from the bead base line BBL to the outer edge Pg of the rim guard 50 relative to the distance HW in the radial direction from the bead base line BBL to the cross-sectional width specified position PW is not less than 1. Accordingly, in molding the tire 2 within the mold 68, the air present between the raw cover 64 and the mold 68 is not divided at the position corresponding to the outer edge Pg of the rim guard 50, and is effectively discharged from the position corresponding to the outer edge Pg toward the top 56 of the rim guard 50. From the viewpoint of improvement of appearance quality, this ratio is preferably not less than 1.01 and more preferably not less than 1.03. From the viewpoint of appropriately maintaining the volume of the rim guard 50, this ratio is preferably not greater than 1.3.

In FIG. 2, a double-headed arrow HT represents the height in the radial direction from the bead base line BBL to the top 56 of the rim guard 50. A double-headed arrow TT represents the length from the external surface 52 of the main body 48 to the top 56 of the rim guard 50, that is, the thickness of the rim guard 50. The length TT is measured along a normal line that passes through the top 56 of the rim guard 50 and is normal to the external surface 52 of the main body 48 (specifically, the lower circular arc).

In the tire 2, the height HT in the radial direction is preferably not less than 28 mm and preferably not greater than 35 mm. By the height HT being set to be not less than 28 mm, the appearance quality is improved, and the rim guard 50 can effectively perform its protection function. On the other hand, by the height HT being set to be not greater than 35 mm, the protection function of the rim guard 50 is effectively maintained, and the rim guard 50 effectively contributes to reduction of air resistance and improvement of steering stability and ride comfort.

In the tire 2, the length TT is preferably not less than 5 mm and preferably not greater than 7 mm. By the length TT being set to be not less than 5 mm, the appearance quality of the side portion 46 is improved, the protection function of the rim guard 50 is effectively maintained, and the rim guard 50 also effectively contributes to improvement of steering stability and ride comfort. On the other hand, by the length TT being set to be not greater than 7 mm, the shapes of the beads 14 and the clinches 12 are effectively prevented from deviating from the desired shapes, and the rim guard 50 effectively contributes to reduction of air resistance.

As described above, with the tire 2, the appearance quality and the protection function of the rim guard 50 are improved. With the mold 68 for the tire 2 according to the present invention and the method for manufacturing the tire 2 according to the present invention, the pneumatic tire 2 having improved appearance quality and an improved protection function by each rim guard 50 is obtained. The effect based on the shape of the rim guard 50 of the present invention is particularly effectively exhibited in the tire 2 having an aspect ratio that is set within a range of not less than 25% and not greater than 55%.

EXAMPLES

The following will describe the present invention in further detail by means of examples, etc., but the present invention is not limited to these examples.

Example 1

A tire (size: 225/45R17 94Y) having the basic structure shown in FIG. 1 and having the specifications shown in Table 1 below was obtained by using the mold shown in FIG. 3.

As represented by "Outer" in the cell of the position of the inner surface in Table 1, the contour of the inner surface of the rim guard was represented by a circular arc having a center located at the outer side of the tire. The radius Ru of the circular arc was 25 mm. As represented by "Outer" in the cell of the position of the outer surface in Table 1, the contour of the outer surface of the rim guard was represented by a circular arc having a center located at the outer side of the tire. The radius Rs of the circular arc was 300 mm.

The ratio (HS/HW) of the distance HS in the radial direction from the bead base line BBL to the outer edge Pg of the rim guard relative to the distance HW in the radial direction from the bead base line BBL to the cross-sectional width specified position PW was 1.05. The height HT in the radial direction from the bead base line BBL to the top of the rim guard was 29 mm. The length TT from the external surface of the main body to the top of the rim guard was 6.0 mm.

Comparative Example 1

A tire of Comparative Example 1 was obtained in the same manner as Example 1, except that the radius Ru, the radius Rs, the ratio (HS/HW), and the length TT were as shown in Table 1 below. The tire of Comparative Example 1 is a conventional tire.

Comparative Example 2

A tire of Comparative Example 2 was obtained in the same manner as Example 1, except that the radius Ru, the radius Rs, the ratio (HS/HW), the height HT, and the length TT were as shown in Table 1 below. The tire of Comparative Example 2 is a conventional tire.

Examples 2 and 3 and Comparative Examples 3 and 4

Tires of Examples 2 and 3 and Comparative Examples 3 and 4 were obtained in the same manner as Example 1, except that the radius Rs was as shown in Table 1 below.

Comparative Examples 5 and 6

Tires of Comparative Examples 5 and 6 were obtained in the same manner as Example 1, except that the radius Ru was as shown in Table 2 below.

Examples 4 and 5

Tires of Examples 4 and 5 were obtained in the same manner as Example 1, except that the length TT was as shown in Table 2 below.

Examples 6 and 7

Tires of Examples 6 and 7 were obtained in the same manner as Example 1, except that the height HT was as shown in Table 2 below.

Comparative Example 7

A tire of Comparative Example 7 was obtained in the same manner as Example 1, except that the contour of the outer surface of the rim guard was represented by a circular arc having a center at the inner side of the tire. The contour of the outer surface of the rim guard being represented by the circular arc having a center at the inner side of the tire, is represented by "Inner" in the cell of the position of the outer surface in Table 2.

[Bead Shape]

How much the shapes of the beads and the apexes of the sample tires correspond to the designed shapes was confirmed. The results are shown as indexes in Table 1 and Table 2 below. A higher value indicates that the shapes do not deviate from the desired shapes and are better.

[Side Portion Appearance]

The appearance of the sample tires was observed to confirm the rate of occurrence of poor appearance due to remaining air. The results are shown as indexes in Table 1 and Table 2 below. A higher value indicates that the appearance is better.

[Protection Function]

Each sample tire was fitted onto a normal rim and inflated with air to a normal internal pressure. The tire was mounted to a test vehicle (passenger car). The degree of scarring formed when the vehicle was moved close to a curb was confirmed. The results are shown as indexes in Table 1 and Table 2 below. A higher value indicates that the protection function of the rim guard is more favorably performed.

[Air Resistance]

Each sample tire was fitted onto a normal rim and inflated with air to a normal internal pressure. The tire was mounted to a test vehicle (passenger car). When the vehicle was running at a speed of 80 km/hour, the gear was changed to neutral, and the distance was measured until the vehicle stopped. The results are shown as indexes in Table 1 and Table 2 below. A higher value indicates that the air resistance is lower.

[Balance]

Each sample tire was fitted onto a normal rim and inflated with air to a normal internal pressure. The tire was mounted to a test vehicle (passenger car). The vehicle was caused to run on a circuit course, and the driver evaluated steering stability and ride comfort. The results are shown as indexes in Table 1 and Table 2 below. A higher value indicates that steering stability and ride comfort are better balanced.

[Combined Performance]

The sum of the indexes obtained in the respective evaluations was obtained. The results are shown as combined performance in Table 1 and Table 2 below. A higher value indicates that the performance is better.

TABLE 1

| | | Ex. 1 | Comp. Ex. 1 | Comp. Ex. 2 | Comp. Ex. 3 | Ex. 2 | Ex. 3 | Comp. Ex. 4 |
|---|---|---|---|---|---|---|---|---|
| Inner surface | Ru [mm] | 25 | 8 | 8 | 25 | 25 | 25 | 25 |
| | Position | Outer | Outer | Outer | Outer | Outer | Outer | Outer |
| Outer surface | Rs [mm] | 300 | 45 | 45 | 45 | 250 | 350 | 600 |
| | Position | Outer | Outer | Outer | Outer | Outer | Outer | Outer |
| | HS/HW [—] | 1.05 | 1.00 | 0.90 | 1.05 | 1.05 | 1.05 | 1.05 |
| | HT [mm] | 29 | 29 | 25 | 29 | 29 | 29 | 29 |
| | TT [mm] | 6.0 | 5.5 | 5.5 | 6.0 | 6.0 | 6.0 | 6.0 |
| | Bead shape | 100 | 70 | 60 | 80 | 100 | 100 | 100 |
| | Side portion appearance | 100 | 80 | 70 | 80 | 100 | 100 | 85 |
| | Protection function | 100 | 85 | 80 | 90 | 100 | 100 | 100 |
| | Air resistance | 100 | 95 | 90 | 95 | 100 | 100 | 90 |
| | Balance | 100 | 85 | 80 | 90 | 100 | 100 | 80 |
| | Combined | 500 | 415 | 380 | 435 | 500 | 500 | 455 |

TABLE 2

| | | Comp. Ex. 5 | Comp. Ex. 6 | Ex. 4 | Ex. 5 | Ex. 6 | Ex. 7 | Comp. Ex. 7 |
|---|---|---|---|---|---|---|---|---|
| Inner surface | Ru [mm] | 8 | 40 | 25 | 25 | 25 | 25 | 25 |
| | Position | Outer | Outer | Outer | Outer | Outer | Outer | Outer |
| Outer surface | Rs [mm] | 300 | 300 | 300 | 300 | 300 | 300 | 300 |
| | Position | Outer | Outer | Outer | Outer | Outer | Outer | Inner |
| | HS/HW [—] | 1.05 | 1.05 | 1.05 | 1.05 | 1.05 | 1.05 | 1.05 |
| | HT [mm] | 29 | 29 | 29 | 29 | 25 | 40 | 29 |
| | TT [mm] | 6.0 | 6.0 | 4.0 | 8.0 | 6.0 | 6.0 | 6.0 |
| | Bead shape | 80 | 95 | 100 | 95 | 95 | 100 | 100 |
| | Side portion appearance | 100 | 95 | 95 | 100 | 100 | 100 | 80 |
| | Protection function | 90 | 100 | 95 | 100 | 95 | 95 | 100 |
| | Air resistance | 95 | 95 | 100 | 95 | 100 | 95 | 80 |
| | Balance | 90 | 85 | 95 | 100 | 100 | 95 | 95 |
| | Combined | 455 | 470 | 485 | 490 | 490 | 485 | 455 |

As shown in Table 1 and Table 2, the examples are highly rated, as compared to the comparative examples. In particular, in the examples, not only the appearance quality and the protection function of the rim guard are improved, but also reduction of air resistance and improvement of steering stability and ride comfort are achieved. From the evaluation results, advantages of the present invention are clear.

The above descriptions are merely illustrative examples, and various modifications can be made without departing from the principles of the present invention.

What is claimed is:

1. A pneumatic tire comprising:
a tread; and
a pair of side portions each located radially inward of an edge of the tread, each side portion including a main body and a rim guard projecting axially outward from an external surface of the main body, wherein
the rim guard has a top, an inner surface located radially inward of the top, and an outer surface located radially outward of the top,
a contour of the inner surface is represented by a circular arc having a center at an outer side of the tire, and the circular arc has a radius of not less than 20 mm and not greater than 30 mm,
a contour of the outer surface is represented by a circular arc having a center at the outer side of the tire, and the circular arc has a radius of not less than 100 mm and not greater than 500 mm, and
in a radial direction, a position of an outer edge of the outer surface coincides with a cross-sectional width specified position, or the outer edge of the outer surface is located outward of the cross-sectional width specified position.

2. The pneumatic tire according to claim 1, wherein a height in the radial direction from a bead base line to the top is not less than 28 mm and not greater than 35 mm.

3. The pneumatic tire according to claim 2, wherein a length from the external surface of the main body to the top is not less than 5 mm and not greater than 7 mm.

4. The pneumatic tire according to claim 3, wherein a ratio of a distance in the radial direction from a bead base line to the outer edge of the outer surface of the rim guard relative to a distance in the radial direction from the bead base line to the cross-sectional width specified position is not less than 1.01 and not greater than 1.3.

5. The pneumatic tire according to claim 3, wherein
a contour of the external surface of the main body is represented by a plurality of circular arcs including: a lower circular arc that represents a portion at a radially inner side of the cross-sectional width specified position; and an upper circular arc that represents a portion at a radially outer side of the cross-sectional width specified position, and
the upper circular arc is tangent to the lower circular arc at the cross-sectional width specified position.

6. The pneumatic tire according to claim 2, wherein
a contour of the external surface of the main body is represented by a plurality of circular arcs including: a lower circular arc that represents a portion at a radially inner side of the cross-sectional width specified position; and an upper circular arc that represents a portion at a radially outer side of the cross-sectional width specified position, and
the upper circular arc is tangent to the lower circular arc at the cross-sectional width specified position.

7. The pneumatic tire according to claim 1, wherein a length from the external surface of the main body to the top is not less than 5 mm and not greater than 7 mm.

8. The pneumatic tire according to claim 7, wherein a ratio of a distance in the radial direction from a bead base line to the outer edge of the outer surface of the rim guard relative to a distance in the radial direction from the bead base line to the cross-sectional width specified position is not less than 1.01 and not greater than 1.3.

9. The pneumatic tire according to claim 7, wherein
a contour of the external surface of the main body is represented by a plurality of circular arcs including: a lower circular arc that represents a portion at a radially inner side of the cross-sectional width specified position; and an upper circular arc that represents a portion at a radially outer side of the cross-sectional width specified position, and
the upper circular arc is tangent to the lower circular arc at the cross-sectional width specified position.

10. The pneumatic tire according to claim 1, wherein a ratio of a distance in the radial direction from a bead base line to the outer edge of the outer surface of the rim guard relative to a distance in the radial direction from the bead base line to the cross-sectional width specified position is not less than 1.01 and not greater than 1.3.

11. The pneumatic tire according to claim 10, wherein
a contour of the external surface of the main body is represented by a plurality of circular arcs including: a lower circular arc that represents a portion at a radially inner side of the cross-sectional width specified position; and an upper circular arc that represents a portion at a radially outer side of the cross-sectional width specified position, and
the upper circular arc is tangent to the lower circular arc at the cross-sectional width specified position.

12. The pneumatic tire according to claim 2, wherein a ratio of a distance in the radial direction from a bead base line to the outer edge of the outer surface of the rim guard relative to a distance in the radial direction from the bead base line to the cross-sectional width specified position is not less than 1.01 and not greater than 1.3.

13. The pneumatic tire according to claim 1, wherein
a contour of the external surface of the main body is represented by a plurality of circular arcs including: a lower circular arc that represents a portion at a radially inner side of the cross-sectional width specified position; and an upper circular arc that represents a portion at a radially outer side of the cross-sectional width specified position, and
the upper circular arc is tangent to the lower circular arc at the cross-sectional width specified position.

14. The pneumatic tire according to claim 1, wherein
the side portion includes a sidewall located radially inward of the edge of the tread and a clinch located radially inward of the sidewall, and
a boundary between the sidewall and the clinch is included in the rim guard.

15. The pneumatic tire according to claim 14, wherein an edge of the boundary is located on the inner surface.

16. The pneumatic tire according to claim 1, wherein the pneumatic tire has an aspect ratio of not less than 25% and not greater than 55%.

* * * * *